United States Patent [19]

Ive

[11] Patent Number: 4,855,843

[45] Date of Patent: Aug. 8, 1989

[54] DIGITAL VIDEO RECORDING

[75] Inventor: John G. S. Ive, Basingstoke, United Kingdom

[73] Assignee: Sony Corporation, Tokyo, Japan

[21] Appl. No.: 83,903

[22] Filed: Aug. 6, 1987

[30] Foreign Application Priority Data

Oct. 5, 1984 [GB] United Kingdom ................. 8425179

[51] Int. Cl.$^4$ ............................................. H04N 5/78
[52] U.S. Cl. .................................. 360/10.2; 360/10.3; 360/19.1; 360/32; 360/77.12; 360/78.02; 358/343
[58] Field of Search .................... 360/10.2, 10.3, 10.1, 360/33.1, 19.1, 9.1, 32, 84, 78, 77; 358/335, 343, 907

[56] References Cited

U.S. PATENT DOCUMENTS

| | | | |
|---|---|---|---|
| 3,395,248 | 7/1968 | Suzuki | 360/10.3 |
| 3,816,850 | 6/1974 | Otsuka | 360/19.1 |
| 3,921,132 | 11/1975 | Baldwin | 360/33.1 |
| 4,330,795 | 5/1982 | Foerster | 360/33.1 |
| 4,542,419 | 9/1985 | Morio | 358/343 |
| 4,558,377 | 12/1985 | Collins | 360/10.1 |
| 4,626,912 | 12/1986 | Wilkinson | 358/141 |

FOREIGN PATENT DOCUMENTS

| | | | |
|---|---|---|---|
| 87114 | 8/1983 | European Pat. Off. | 360/19.1 |
| 2098021 | 11/1982 | United Kingdom | 360/10.1 |
| 2120423 | 11/1983 | United Kingdom | 358/141 |

Primary Examiner—Aristotelis M. Psitos
Attorney, Agent, or Firm—Lewis H. Eslinger; Jay H. Maioli

[57] ABSTRACT

A method of recording and reproducing a digital video signal, the method comprising recording the video signal in oblique tracks on a magnetic tape using a four-head digital video tape recorder, the four heads being arranged in two head pairs disposed on diametrically opposite sides of a rotary head drum, and the video data relating to each field being distributed evenly between the four heads for recording, each oblique track comprising two half-tracks separated by a central gap in which audio data may be recorded, and each field occupying a plurality of successively recorded pairs of half-tracks with each field boundary located at a central gap, and reproducing the video signal at a speed different from the normal reproduction speed using dynamic tracking by successively reproducing two half-tracks from the first part of a first pair of adjacent oblique tracks, then jumping to reproduce two half-tracks from the second part of a second pair of adjacent oblique tracks adjacent to the first pair and so on until all the data of one field has been reproduced, and then jumping to another field.

15 Claims, 2 Drawing Sheets

DIGITAL VIDEO RECORDING

This is a continuation of application Ser. No. 06/780,943, filed 9-27-85 now abandoned.

BACKGROUND OF THE INVENTION

1. Field of the Invention

This invention relates to digital video recording. More particularly, it relates to methods of recording and reproducing digital video signals on and from a magnetic tape, to magnetic tapes having signals recorded thereon by such methods, and to apparatus for recording and reproducing signals by such methods.

2. Description of the Prior Art

The practice of digitally recording video signals and the associated audio signals is well established and is in common use at least in broadcasting studios. For the purpose of such recording, the incoming analog video and audio signals are sampled, the resulting samples are pulse code modulation coded, and the resulting digital signals, usually after further coding to provide for error detection and correction after reproduction, are recorded in oblique tracks on a magnetic tape using a digital video tape recorder. Digital audio signals are usually grouped in one or two blocks which are located at the beginning and/or the end of each oblique track.

One form of digital video tape recorder which has been proposed records twelve oblique tracks per field when the signal recorded relates to a 625 lines per frame, 50 fields per second television system, and ten oblique tracks per field when the signal recorded relates to a 525 lines per frame, 60 fields per second television system. This can be achieved by providing the rotary head drum of the digital video tape recorder with four recording heads arranged in two pairs on diametrically opposite sides of the rotary head drum, which is arranged to be rotated at three times the 50 fields per second field rate or 2.5 times the 60 fields per second field rate, that is, in each case, at 150 revolutions per second.

To improve the protection against errors and in particular to provide protection against a situation in which on reproduction the output of one of the four reproducing heads is lost entirely, it is preferred to distribute the data evenly between the four recording heads when recording. In 625/50 operation this presents no problems, because a field occupies twelve oblique tracks and twelve is divisible by four. In 525/60 operation a field occupies ten oblique tracks, and to overcome the problem resulting from ten not being divisible by four, it has been proposed to consider the ten oblique tracks as twenty half-tracks and to start recording of each field at a mid-track position. In other words, the field boundaries are at mid-track positions. This is illustrated in FIG. 1 of the accompanying drawings, in which FIG. 1A indicates diagrammatically the format of twelve oblique tracks making up one field in 625/50 operation, the letters a, b, c and d indicating the heads which record and reproduce the respective tracks, and FIG. 1B indicates diagrammatically the format of ten oblique tracks, or more precisely twenty half-tracks, making up one filed in 525/60 operation.

These formats permit the required even distribution of the data between the four heads, but results is a problem when reproducing in 525/60 operation at speeds different from the normal reproduction speed, particularly in fast motion reproduction. So-called dynamic tracking is now well known. This technique involves mounting each reproducing head, or in the case of the four-head digital video tape recorder referred to above, each pair of reproducing heads, on a respective controllable element such as a bimorph leaf. Then, by applying suitable control signals to the controllable elements, the positions of the reproducing heads can be varied relative to the oblique tracks to be scanned, so as more accurately to follow an oblique track and to enable the head to be jumped from one oblique track to another during the interval when the reproducing head is out of contact with the magnetic tape.

In fast motion reproduction it would be convenient to be able to omit complete fields during reproduction, but to jump even just one field the dynamic tracking arrangement must effect a quite substantial movement of the associated head pair. This is possible in 625/50 operation because the large movement takes place during the interval when the head pair is out of contact with the magnetic tape, but in 525/60 operation this is not possible because a field finishes at the mid-track position as indicated in FIG. 1B and there is therefore very little time available to make a field jump.

SUMMARY OF THE INVENTION

One object of the present invention is to provide a method of recording and reproducing a digital video signal in which this problem is alleviated.

Another object of the present invention is to provide a magnetic tape with a recording format for a digital video signal of a 525 lines per frame, 60 fields per second television system.

Another object of the present invention is to provide a magnetic tape with a recording format for a digital video signal of a 625 lines per frame, 50 fields per second television system.

Another object of the present invention is to provide apparatus for recording and reproducing digital video signals in such formats.

Another object of the present invention is to provide apparatus for recording and reproducing digital video signals with mid-track field jumps.

According to the present invention there is provided a method of recording and reproducing a digital video signal, the method comprising:

recording said video signal in oblique tracks on a magnetic tape using four recording heads arranged in two head pairs disposed on diametrically opposite sides of a rotary head drum, the video data relating to each field being distributed evenly between the four heads for recording;

each said oblique track comprising two half-tracks separated by a central gap, and each field occupying a plurality of successively recorded pairs of half-tracks with each field boundary located at a said central gap; and reproducing said video signal at a speed different from the normal reproduction speed using four reproducing heads provided with dynamic tracking and arranged in two head pairs disposed on diametrically opposite sides of a rotary head drum, by successively reproducing two said half-tracks from the first part of a first pair of adjacent oblique tracks, then jumping to reproduce two said half-tracks from the second part of a second pair of adjacent oblique tracks adjacent to said first pair and so on until all the data of one field has been reproduced, and then jumping to another field, each said reproducing head pair making said field jump when it is out of contact with said magnetic tape.

According to the present invention there is also provided a magnetic tape having a digital video signal of a 525 lines per frame, 60 fields per second television system recorded thereon, the video signal having been recorded in oblique tracks on the magnetic tape using a digital video tape recorder and the video data relating to each field having been distributed evenly between four heads for recording, each said oblique track comprising two half-tracks separated by a central gap, and each field occupying ten successively recorded pairs of half-tracks with each field boundary located at a said central gap, and a respective block of audio data recorded in each said central gap.

According to the present invention there is also provided a magnetic tape having a digital video signal of a 625 lines per frame, 50 fields per second television system recorded thereon, the video signal having been recorded in oblique tracks on the magnetic tape using a digital video tape recorder and the video data relating to each field having been distributed evenly between four heads for recording, each said oblique track comprising two half-tracks separated by a central gap, and each field occupying twelve successively recorded pairs of half-tracks with each field boundary located at a said central gap, and a respective block of audio data recorded in each said central gap.

According to the present invention there is also provided apparatus for recording and reproducing digital video signals, the apparatus comprising:

a digital video tape recorder comprising four heads arranged in two head pairs disposed on diametrically opposite sides of a rotary head drum;

means for distributing the video data relating to each field evenly between the four heads for recording;

each said oblique track being recorded as two half-tracks separated by a central gap, and each field occupying a plurality of successively recorded pairs of half-tracks with each field boundary located at a said central gap; respective dynamic tracking arrangements associated with each said head pair; and means for controlling said dynamic tracking arrangements whereby said video signal can be reproduced at speeds different from the normal reproduction speed by successively reproducing two said half-tracks from the first part of a first pair of adjacent oblique tracks, then jumping to reproduce two said half-tracks from the second part of a second pair of adjacent oblique tracks adjacent to said first pair and so on until all the data of one field has been reproduced, and then jumping to another field, each said head pair making said field jump when it is out of contact with said magnetic tape.

According to the present invention there is also provided apparatus for recording and reproducing digital video signals, the apparatus comprising:

a digital video tape recorder comprising a plurality of heads disposed around a rotary head drum;

means for distributing the video data relating to each field between said heads for recording in oblique tracks on a magnetic tape;

each said oblique track being recorded as two half-tracks separated by a central gap, and each field occupying a plurality of successively recorded half-tracks with each field boundary located at a said central gap;

respective dynamic tracking arrangements associated with each said head; and means for controlling said dynamic tracking arrangements whereby said video signal can be reproduced at speeds different from the normal reproduction speed by successively reproducing a said half-track from the first part of a first oblique track, then jumping to reproduce a said half-track from the second part of a second oblique track and so on until all the data of one field has been reproduced, and then jumping to another field, each said head making said field jump when it is out of contact with said magnetic tape.

The above, and other objects, features and advantages of this invention will be apparent from the following detailed description of illustrative embodiments which is to be read in connection with the accompanying drawings.

DESCRIPTION OF THE PREFERRED EMBODIMENTS

The present invention is principally intended to deal with the problem of fast motion reproduction in 525/60 operation, and it will therefore first be described in that context.

Figure 2:
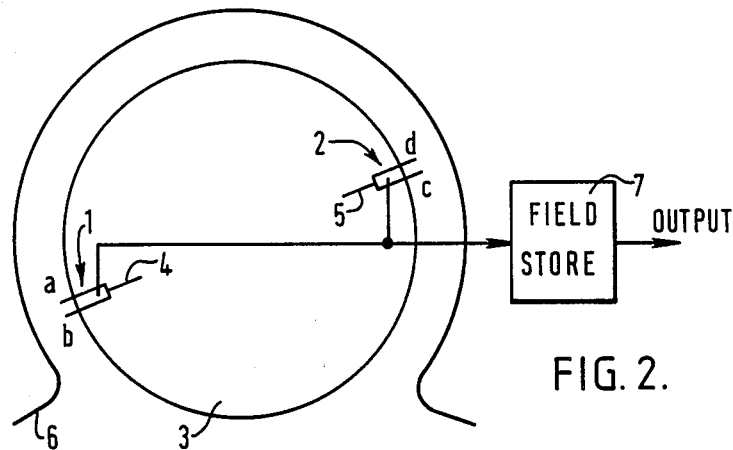
FIG. 2 shows diagrammatically a rotary head drum of a digital video tape recorder and an associated field store.

Referring first to FIG. 2, the recording and reproducing apparatus used is a digital video tape recorder of the general form referred to above, that is to say a four-head machine in which the four recording and reproducing heads a, b, c and d are mounted in two head pairs 1 and 2 on diametrically opposite sides of a rotary head drum 3. The heads a, b, c and d or the head pairs 1 and 2 are connected to the rotary head drum 3 by respective dynamic tracking arrangements comprising bi-morph leaves 4 and 5 of known form, to which control signals are supplied in known manner to effect the dynamic tracking. A magnetic tape 6 is wrapped around the rotary head drum 3 over an angular distance of some 260 degrees.

To give a specific example of the dimensions involved, the rotary head drum 3 may be approximately 77 mm in diameter, so the circumference is approximately 240 mm. With a wrap angle of the magnetic tape 6 of approximately 260 degrees, each head pair 1 and 2 is in contact with the magnetic tape 6 for approximately 175 mm and out of contact with the magnetic tape 6 for approximately 65 mm of each rotation of the rotary head drum 3. With a one inch (approximately 25.4 mm) magnetic tape 6, it can be taken that the length of each oblique track thereon is approximately 170 mm.

Figure 1A:
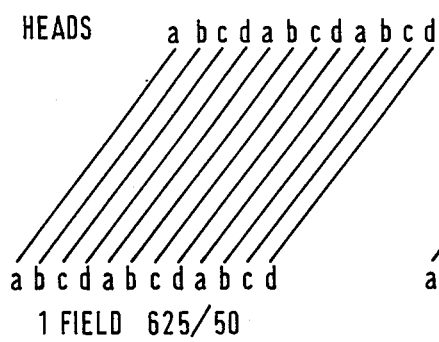
FIG. 1A shows diagrammatically the format of oblique tracks recorded on a magnetic tape in 625/50 operation.
Figure 1B:
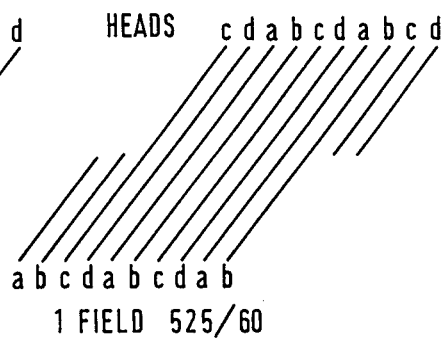
FIG. 1B shows the format of oblique tracks recorded on a magnetic tape in 525/60 operation.
Figure 3:
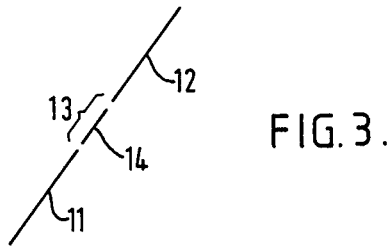
FIG. 3 shows diagrammatically an oblique track.

As described above, in 525/60 operation, each field of the television signal is recorded in twenty half-tracks with the format indicated in FIG. 1B. However, in the present case, as indicated in FIG. 3, the two half-tracks 11 and 12 in each of the oblique tracks do not abut in the centre of the oblique track, and are not separated by a relatively short editing gap, but are separated by a relatively long gap 13, which, in particular, is sufficiently long to result, during reproduction, in a time interval sufficiently long for the head that is reproducing that oblique track to jump at least two tracks in either direction. It is preferred, although it is not essential, that the central gap 13 so created is used to record a block 14 of audio data.

In the case of a machine having the dimensions mentioned above, in which the total length of each oblique track is approximately 170 mm, the length of the central gap 13, or of the audio block 14 if provided, may be approximately 12 mm. If the pitch of the oblique tracks is 45 microns, then a jump of two oblique tracks involves a distance of 90 microns, which can readily be achieved by dynamic tracking arrangements in such a time interval.

When reproducing this format at normal reproduction speed, the oblique tracks are read by the head pairs 1 and 2 in the usual way, the dynamic tracking arrangements ensuring that the head pairs 1 and 2 accurately scan the oblique tracks.

Figure 4A:
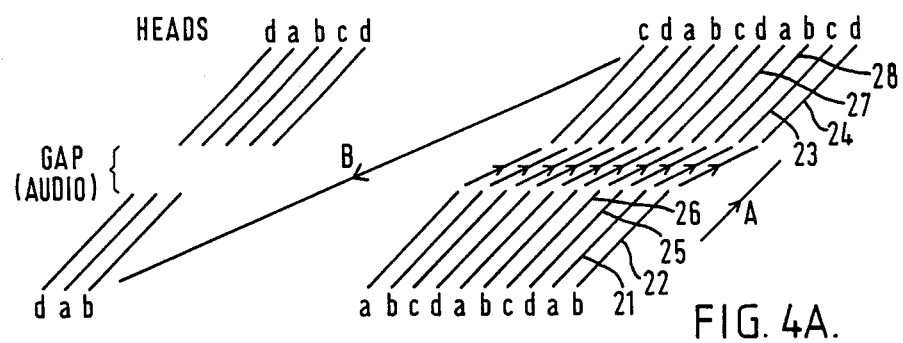
FIG. 4A shows the format of oblique tracks recorded on a magnetic tape and a mode of reproducing the oblique tracks in 525/60 operation and in accordance with the present invention.

Referring now to FIG. 4A, this indicates the method of reproducing this format in a fast motion mode, and in particular at forward double speed. The oblique tracks are read in the direction of the arrow A. The head pair 1, for example, first scans the pair of half-tracks 21 and 22, and on reaching the central gap 13, jumps under the control of the associated dynamic tracking arrangement, to the preceding pair of half-tracks 23 and 24. The head pair 2 meanwhile, but starting a little later, first scans the pair of half-tracks 25 and 26, and, on reaching the central gap 13, jumps, under control of the associated dynamic tracking arrangement, to the preceding pair of half-tracks 27 and 28 which are disposed in the same oblique tracks as the previously scanned half-tracks 21 and 22 respectively. Reproduction proceeds in this way until, as will be seen by comparison of FIG. 4A with FIG. 1B, all twenty half-tracks making up one field have been reproduced. Then, as indicated by the arrow B, both head pairs 1 and 2 jump under control of the associated dynamic tracking arrangements by one complete field and start reproducing the next-but-one field in the manner just described. Each head pair 1 and 2 makes its field jumps when it is out of contact with the magnetic tape 6.

Having regard to the distances involved and the time available, the mid-track jumps and the jumps required between fields are of similar severity for the dynamic tracking arrangements. In fact, the dimensions are selected so that the distance to be jumped per unit time available for the jump is substantially the same.

Referring back to FIG. 2, the data reproduced by the head pairs 1 and 2 are further processed, in particular to effect error detection and correction in known manner, and the corrected data is then supplied to a field store 7 in which the data relating to one field are stored in the order in which they have been reproduced which, it will be noted, is not the correct order, and then when a complete field has been stored, are read out in the correct order. This requirement to re-order the data is in fact unlikely to necessitate the provision of an additional field store, as one will normally be necessary if modes involving reproduction at speeds other than normal reproduction speed are to be used.

Reverse normal speed reproduction is achieved in a generally similar manner, the main differences being that the data for each field are reproduced in a different order, but the necessary re-ordering is again achieved by storing the data in the field store 7 in the reproduction order and then reading them out in the correct order.

For forward or reverse fast motion reproduction at other integral multiples of the normal reproduction speed, two or more complete fields can be jumped in the interval between reading complete fields, the main limitations being the ability of the dynamic tracking arrangements to follow all the half-tracks required to effect reproduction of a complete field when the magnetic tape 6 is moving at high speed, and to effect the necessary jumps between fields.

For forward or reverse fast motion reproduction at speeds which are not integral multiples of the normal reproduction speed, it is still possible to reproduce complete fields, but the jumps between reproduced fields are not then each of the same number of fields. Thus, the number of fields jumped may be from zero upwards, and the number of fields jumped will not necessarily be the same at each jump even when the reproduction speed is constant.

When reading this format in slow motion modes, the oblique tracks are read (and re-read) by the head pairs 1 and 2 in the usual way It will be understood that when the above-described method of reproducing this format in fast motion modes is used, then if the audio block 14 is provided between the two half-tracks 11 and 12 in each oblique track, then it may not be possible to reproduce the audio data, because the head pairs 1 and 2 are jumping tracks at the relevant time. In some cases this is not a problem, because the sound is not required. However, if reproduction of the audio data (albeit necessarily in imperfect form) is required in fast motion modes, then the gap 13 can be left empty and the audio data recorded elsewhere in the oblique tracks, for example, at the beginnings and/or the ends thereof. Alternatively, or in addition, the gap 13 can be made longer and audio data recorded at the beginning and/or the end of the gap 13.

Figure 4B:
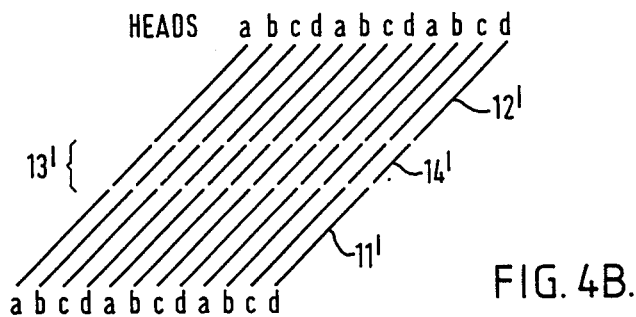
FIG. 4B shows the format of oblique tracks recorded on a magnetic tape in 625/50 operation.

Turning now to 625/50 operation, it will be understood that the format described above and indicated in FIG. 4A is not necessary in this case, because the problems arising from the field boundaries being mid-way along the oblique tracks do not arise. Nevertheless, simply for commonality between machines, it will be preferable to use a similar format for 625/50 operation, as indicated in FIG. 4B. Thus, each oblique track is divided into two half-tracks 11' and 12' with a central gap 13' therebetween, or, alternatively, with an audio block 14' recorded therebetween. In all modes this format is reproduced in the usual way, that is to say there are no mid-track jumps, although complete fields can be jumped.

Figure 4C:
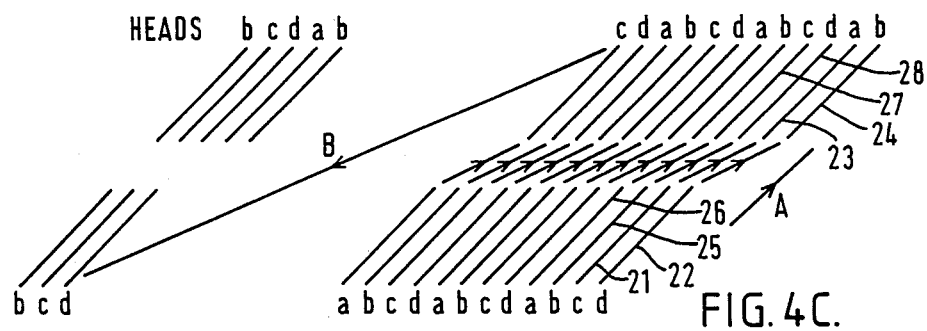
FIG. 4C shows the format of oblique tracks recorded on a magnetic tape and a mode of reproducing the oblique tracks in 625/50 operation and in accordance with the present invention.

To increase still further the commonality between machines, the format used in 625/50 can be made similar to that described for 525/60 operation. This is indicated in FIG. 4C, which is basically the same as FIG. 4A, except that for 625/50 operation twelve oblique tracks, that is twenty-four half-tracks are used. As in the 525/60 operation, the field boundaries are in this case at mid-track positions, and the reproduction is as described with reference to FIG. 4A.

Various modifications are of course possible without departing from the invention as defined in the appended claims. In particular, it should be emphasised that the above dimensions and angles are given merely by way of example. Moreover mid-track, track jumping and field jumping when the head is out of contact with the tape can be used in recording and reproducing apparatus having other numbers of heads, not necessarily in head pairs, disposed around a head drum; such as six heads in three pairs at 120° to each other.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of recording and reproducing a digital video signal, the method comprising:
   recording said video signal in oblique tracks on a magnetic tape using four recording heads arranged in two head pairs disposed on diametrically opposite sides of a rotary head drum, the video data relating to each field being distributed evenly between the four heads for recording;
   each said oblique track comprising two half-tracks separated by a central gap, and each field occupying a plurality of successively recorded pairs of half-tracks with each field boundary located at a said central gap; and
   reproducing said video signal at a speed different from the normal reproduction speed using four reproducing heads provided with dynamic tracking and arranged in two head pairs disposed on diametrically opposite sides of a rotary head drum, by successively reproducing two said half-tracks from the first part of a first pair of adjacent oblique tracks, then jumping to reproduce two said half-tracks from the second part of a second pair of adjacent oblique tracks adjacent to said first pair and so on until all the data of one field has been reproduced, and then jumping to another field, each said reproducing head pair making said field jump when it is out of contact with said magnetic tape.

2. A method according to claim 1 wherein at least some of said field jumps involve omission of at least one field.

3. A method according to claim 1 wherein a respective block of audio data is recorded in each said central gap.

4. A method according to claim 1 wherein said reproduced data is supplied to a field store.

5. A method according to claim 1 wherein said digital video signal relates to a 525 lines per frame, 60 fields per second television system, and said plurality is ten.

6. A method according to claim 1 wherein said digital video signal relates to a 625 lines per frame, 50 fields per second television system, and said plurality is twelve.

7. Apparatus for recording and reproducing digital video signals, the apparatus comprising:
   a digital video tape recorder comprising four heads arranged in two head pairs disposed on diametrically opposite sides of a rotary head drum;
   means for distributing the video data relating to each field evenly between the four heads for recording;
   each said oblique track being recorded as two half-tracks separated by a central gap, and each field occupying a plurality of successively recorded pairs of half-tracks with each field boundary located at a said central gap; respective dynamic tracking arrangements associated with each said head pair; and
   means for controlling said dynamic tracking arrangements whereby said video signal can be reproduced at speeds different from the normal reproduction speed by successively reproducing two said half-tracks from the first part of a first pair of adjacent oblique tracks, then jumping to reproduce two said half-tracks from the second part of a second pair of adjacent oblique tracks adjacent to said first pair and so on until all the data of one field has been reproduced, and then jumping to another field, each said head pair making said field jump when it is out of contact with said magnetic tape.

8. Apparatus according to claim 7 further comprising means for supplying respective blocks of audio data for recording in each said central gap.

9. Apparatus according to claim 7 further comprising a field store to which said reproduced data is supplied.

10. Apparatus for recording and reproducing digital video signals, the apparatus comprising:
    a digital video tape recorder comprising a plurality of heads disposed around a rotary head drum means for distributing the video data relating to each field between said heads for recording in oblique tracks on a magnetic tape;
    each said oblique track being recorded as two half-tracks separated by a central gap, and each field occupying a plurality of successively recorded half-tracks with each field boundary located at said central gap;
    respective dynamic tracking arrangements associated with each said head; and
    means for controlling said dynamic tracking arrangements whereby said video signals can be reproduced at speeds different than the normal reproduction speed by successively reproducing a said half-track from the first part of a first oblique track, then jumping to reproduce a said half-track from the second part of a second oblique track and so on until all the data of one field has been reproduced, and then jumping to another field, each pair of said heads making said field jump when it is out of contact with said magnetic tape.

11. A method of reproducing a digital video signal recorded at a rate of 525 lines per frame, 60 fields per second, in oblique tracks on a magnetic tape, in which each oblique track is formed of two half-tracks separated by a central gap and each field boundary located at said central gap, comprising the steps of:
    providing four reproducing heads provided with dynamic tracking and arranged in two head pairs on a rotary head drum;
    reproducing said video signal at a speed different than a normal reproduction speed using the four reproducing heads by successively reproducing two of the half-tracks from the first part of a first pair of adjacent oblique tracks;
    jumping the heads to reproduce two of the half-tracks from the second part of a second pair of oblique tracks adjacent said first pair of oblique tracks;

repeating said steps of reproducing and jumping until a video signal of one field has been reproduced; and jumping the heads to another field during a time when the heads being jumped are out of contact with the magnetic tape.

12. A method according to claim 11, in which said step of jumping the heads to another field includes jumping the heads to the field next to the field adjacent the field being reproduced, thereby omitting the adjacent field.

13. A method according to claim 11, comprising the further step of storing the reproduced video signal of one field in the order in which the tracks of one field are reproduced in a field store memory, and reading out the video signal stored in the field store in a correct order corresponding to the order in which the video signal was recorded in the oblique tracks.

14. A method according to claim 11, in which the step of providing four reproducing heads includes the step of arranging the heads as two, diametrically opposed, pairs on the rotary head drum.

15. A method according to claim 14, comprising the further step of wrapping the magnetic tape around the rotary head drum over a wrap angle that exceeds 180°.

* * * * *